US009549417B2

(12) United States Patent
Olsson et al.

(10) Patent No.: US 9,549,417 B2
(45) Date of Patent: Jan. 17, 2017

(54) SIMPLIFIED PRACH PROCEDURE USING SPECULATIVE RANDOM ACCESS RESPONSE

(75) Inventors: Thomas Olsson, Karlshamn (SE); Peter Brauer, Lodose (SE); Anders Carlsson, Lund (SE); Roland Carlsson, Ojersjo (SE); David Engdal, Torslanda (SE); Henrik Sahlin, Molnlycke (SE); Jim Svensson, Bandhagen (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 95 days.

(21) Appl. No.: 14/406,051

(22) PCT Filed: Jun. 21, 2012

(86) PCT No.: PCT/EP2012/061932
§ 371 (c)(1),
(2), (4) Date: Dec. 5, 2014

(87) PCT Pub. No.: WO2013/189540
PCT Pub. Date: Dec. 27, 2013

(65) Prior Publication Data
US 2015/0124734 A1 May 7, 2015

(51) Int. Cl.
*H04W 74/08* (2009.01)
*H04W 74/00* (2009.01)
*H04W 72/04* (2009.01)

(52) U.S. Cl.
CPC ......... *H04W 74/0833* (2013.01); *H04W 72/04* (2013.01); *H04W 74/002* (2013.01)

(58) Field of Classification Search
None
See application file for complete search history.

(56) References Cited

U.S. PATENT DOCUMENTS

2009/0156194 A1* 6/2009 Meylan ............. H04W 74/0866
455/422.1
2010/0158050 A1* 6/2010 Yang .................. H04L 27/2647
370/498

(Continued)

FOREIGN PATENT DOCUMENTS

EP 2 101 538 A2 9/2009
WO 2006/092801 A2 9/2006

OTHER PUBLICATIONS

PCT International Search Report, mailed Mar. 15, 2013, in connection with International Application No. PCT/EP2012/061932, all pages.

(Continued)

*Primary Examiner* — Hassan Kizou
*Assistant Examiner* — Deepa Belur
(74) *Attorney, Agent, or Firm* — Patents on Demand, P.A.; Brian K. Buchheit; Scott M. Garrett (57) ABSTRACT

The present invention relates to method and arrangement in cellular mobile communication systems, in particular for handling of a physical random access channel for example in a Long Term Evolution communication network. By sending to at least one user equipment, UE, in a communication network cell an un-solicited speculative random access response, RAR, message comprising information relating to at least one of pre-amble identifier, allocated UE identifier, and uplink resource allocation data for L2/L3 message, it is possible to reduce the complexity of the access node, e.g. an eNodeB.

16 Claims, 6 Drawing Sheets

(56) References Cited

U.S. PATENT DOCUMENTS

| | | | |
|---|---|---|---|
| 2010/0254333 A1* | 10/2010 | Shin | H04W 74/02 |
| | | | 370/329 |
| 2011/0039499 A1* | 2/2011 | Zhang | H04W 74/008 |
| | | | 455/67.11 |
| 2015/0016312 A1* | 1/2015 | Li | H04W 74/0833 |
| | | | 370/280 |
| 2016/0192420 A1* | 6/2016 | Kim | H04W 74/00 |
| | | | 370/329 |

OTHER PUBLICATIONS

PCT Written Opinion, mailed Mar. 15, 2013, in connection with International Application No. PCT/EP2012/061932, all pages.
3GPP TS 36.211, Version 10.4.0 "LTE; Evolved Universal Terrestrial Radio Access (E-UTRA) (Release 10)" Dec. 2011, pp. 1-101.

* cited by examiner

SIMPLIFIED PRACH PROCEDURE USING SPECULATIVE RANDOM ACCESS RESPONSE

TECHNICAL FIELD

The present invention relates to methods and arrangements in cellular mobile communication systems, in particular for handling of a physical random access channel (PRACH), for example in a long term evolution (LTE) communication network.

BACKGROUND

In modern cellular radio systems, the radio network has a strict control on the behaviour of the terminal. Uplink transmission parameters like frequency, timing, and power are regulated via downlink control signalling from the base station to the terminal. This is also true for long term evolution (LTE) based cellular wireless communication networks.

In the uplink, a physical layer is based on Single Carrier-Frequency Division Multiple Access (SC-FDMA), which is also referred to as pre-coded Orthogonal Frequency-Division Multiplexing (OFDM). A cyclic prefix is used before each SC-FDMA symbol in order to combat channel delay spread and propagation delay. The cyclic prefix is prefixing of a symbol with a repetition in a wireless communication signal. The communication system uses the cyclic prefix for providing a guard interval to handle delays and provide a support for Fast Fourier Transform (FFT) processing of the signals.

In order for a base station (e.g. called eNodeB in LTE based networks) to control a terminal (also called user equipment, abbreviated to UE) or other equipment connecting to the network, measurements on an uplink signal are required. The determination of timing misalignment requires a comparison of the timing of a received signal with a reference clock in eNodeB. Timing misalignment is caused by unknown propagation delay and the mutual drift between the clocks in the eNodeB and in the UE.

Uplink measurements are rather straightforward when the UE has established a duplex connection with the eNodeB. In that case, uplink signals are present for the measurements, whereas downlink signals can carry the control signalling to adjust the UE parameters. However, when the UE is not connected but is in standby, it only listens to the downlink control signal periodically. Thus, there is no uplink signal for the eNodeB to measure. Before connection establishment, the UE has to carry out a random access (RA) procedure. This is initiated by the UE transmitting a random access burst through a radio interface to the eNodeB to request channel assignments. This random access burst is performed on a random access channel (RACH).

A physical random access channel (PRACH) is provided for the UE to request access to the network. This means that random access bursts must be detected with good confidence and, when detected, used for propagation delay estimation. The used access burst (AB) contains a preamble with a specific bit sequence that has good auto-correlation properties.

In for example the 3GPP standard for LTE [3GPP TS 36.211 v10], the PRACH is arranged to comprise up to 64 different preambles which the UE can select among. These sequences are constructed by a number of base sequences and cyclic shifts of these. Here, the choice of the size of the cyclic shift is depending on the delay spread of the channel and the maximum round trip time of the current cell. For a small cell, this cyclic shift can be configured to a small number such that only one base sequence is needed for construction of all 64 preambles.

Figure 3:
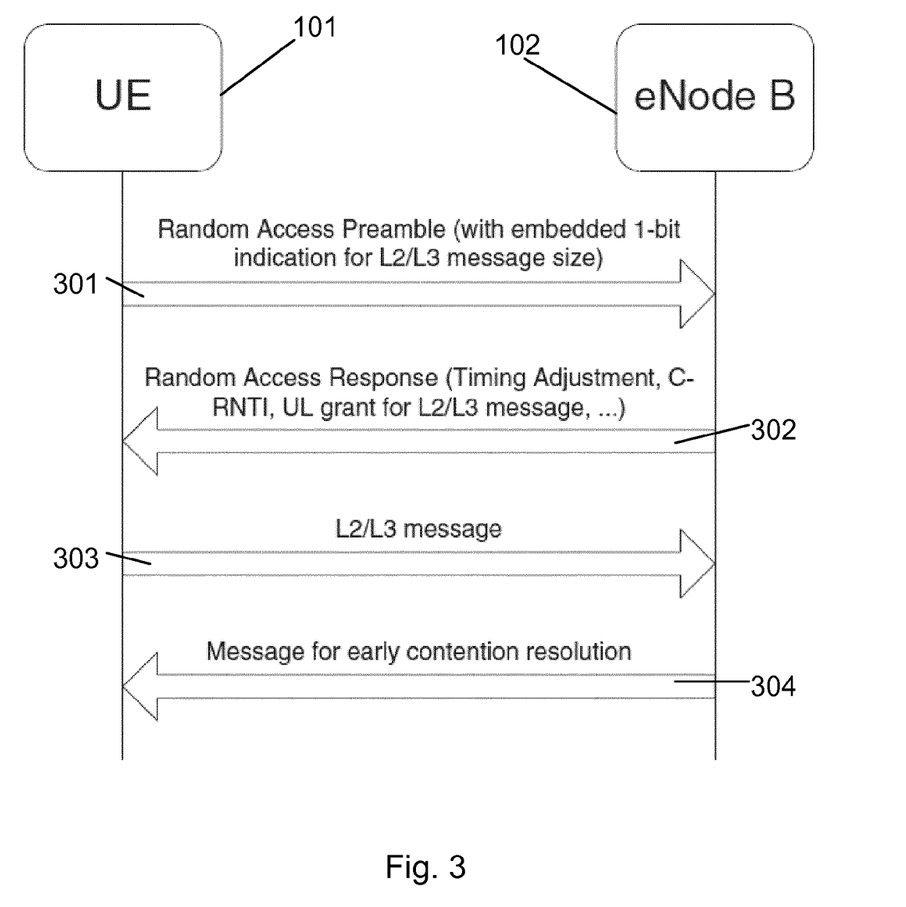
FIG. 3 is a schematic block diagram illustrating an exemplary signalling flow according to the present invention.

FIG. 3 shows the PRACH signalling scheme between UE and eNodeB. The signalling starts with the UE sending a preamble within a predefined time window. The eNodeB then needs to detect the incoming PRACH preamble and send a Random Access Response (RAR) containing an identifier of the used preamble within a given timeframe. The identifier shows the detected preamble (out of the 64 possible) and the time-frequency slot in which the preamble was detected. This RAR also contains timing alignment (TA) instructions, an initial uplink resource grant and an assignment of a Cell Radio Network Temporary Identifier (C-RNTI). The UE then answers with a so-called "Step 3 message" which is used for early contention resolution, i.e. for instance to resolve any collisions related to several UEs using identical signatures when initiating the PRACH procedure.

Lately there has been an increased interest in smaller cell deployment for instance in home or office environment. However, the PRACH procedure for LTE is typically designed (and standardized) for macro cell deployment, which gives room for simplifications for small cell deployment.

The PRACH detection has a potential of being very demanding when it comes to hardware requirement for eNodeB. A typical PRACH detector (although there are alternative solutions) may for instance contain large buffers, a DFT of size 24576, several inverse DFTs of size 1024, and matched filters. This type of LTE PRACH detector is unnecessarily complicated for small cells. Hence there is a need for method and apparatus to reduce PRACH hardware load for an eNodeB in a small cell.

SUMMARY

It is an object to obviate at least some of the above disadvantages and provide an improved node and method for wireless telecommunication networks. This may be done by utilizing the fact that since one purpose of a physical random access channel (PRACH) procedure is to measure and report the propagation delay between a user equipment (UE) and the eNodeB it is interesting to note that such a delay is very short for a small cell. The timing measurement of the PRACH for Long Term Evolution (LTE) results in a timing advance command (TA), transmitted to the UE from eNodeB, with timing resolution of 0.52 microseconds, which corresponds to a physical distance of about 150 meters. This rather coarse resolution is acceptable since Single Carrier-Frequency Division Multiple Access (SC-FDMA) symbols in LTE uplink in small LTE cells are preceded by a 4.7 microsecond long cyclic prefix, which ensures that the signalling between UE and eNodeB is aligned with enough accuracy if the cell is small enough.

Furthermore, the identification procedure during PRACH may be simplified since there are typically fewer users in the small cell compared to a macro cell.

In the present invention it is suggested to reduce the complexity of PRACH handling by removing preamble detection or implementing a simplified PRACH detector that only detects if there is at least one preamble transmitted without identifying the preamble.

In both cases, speculative RARs are transmitted. When there is no detector at all, RAR is always transmitted for all configured preamble signatures. When there is a simplified detector, and if it is detected that there is at least one preamble transmitted then:

Send a RAR for each potential received preamble signature and in both cases let the Temporary C-RNTI and uplink resource grant be identical for each RAR. This leads to that only one step 3 message has to be decoded on the expense of higher collision probability. This higher collision probability is still acceptably low in case of low cell load, which can be expected for small cells. The detector may alternatively detect if at least one preamble in a sub-set of all available preambles are transmitted, where the sub-set comprise more than one preamble. Then a RAR is transmitted for each potential received preamble signature within this set.

This is provided in a first aspect of the present invention, a network infrastructure access device in a wireless telecommunications network serving a wireless communication cell.

The device may comprise at least one processing unit, at least one receiving unit, and at least one transmitting unit. The processing unit may be arranged to send, using the transmitting unit, to at least one UE in the cell an unsolicited speculative random access response, RAR, message. The RAR message may comprise information relating to at least one of pre-amble identifier, allocated UE identifier, and uplink resource allocation data for L2/L3 message. The processing unit may further be arranged to receive, using the receiving unit, the L2/L3 message from the UE comprising allocated UE identifier and UE identity.

The processing unit may further be arranged to decide to send the speculative RAR message by detection of at least one pre-amble from a signal on a physical random access channel, PRACH, signal received using the receiving unit from a connecting user equipment (UE).

The device may further comprise a PRACH detector arranged to detect a PRACH message on the communication interface. The PRACH detector may comprise a fast Fourier transform operating on a sub-set of available antenna signal data for extracting a received PRACH data set and further comprising an energy detector for detecting energy content in the received PRACH data set for detecting a presence of at least one PRACH message in a communication message received from at least one UE.

The device may be arranged to only detect a PRACH signal irrespective of sending UE and transmit a response message out in the cell for possible reception of at least one UE in the cell.

The allocated UE identifier may be a Cell Radio Network Temporary Identifier, C-RNTI and the RAR message may be part of a Media Access Control, MAC, payload message comprising one or several RAR messages.

A second aspect of the present invention is provided, a method in a wireless telecommunications network serving a wireless communication cell. The method may comprise steps of sending, using the communication interface, to at least one UE in the cell a random access response, RAR, message comprising information relating to at least one of baseband, cyclic shift, allocated UE identifier, and frequency for L2/L3 message, and receiving, using the communication interface, the L2/L3 message from the UE comprising allocated UE identifier and UE identity.

The embodiments described above leads to the advantage of low implementation cost for PRACH handling in base stations handling cells with low number of UEs connecting.

Further advantages of the invention will appear from the following detailed description of the invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
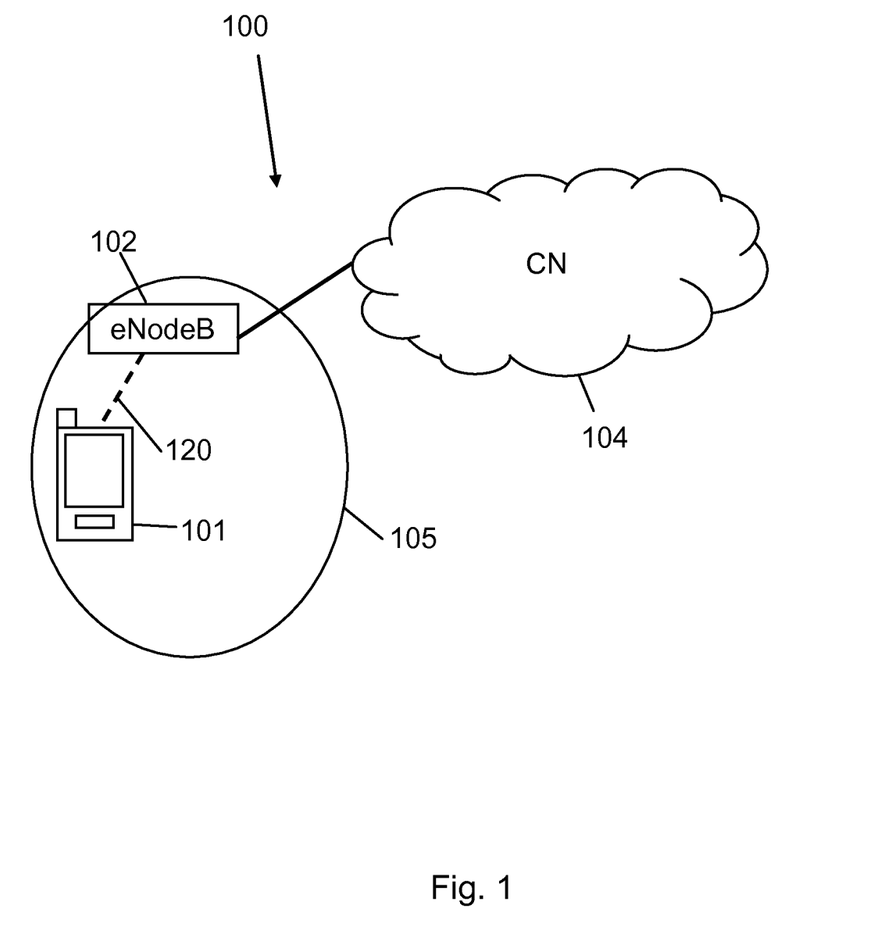
FIG. 1 is a schematic block diagram illustrating an example network according to the present invention.

In FIG. 1 reference numeral 100 indicate a cellular, optionally packet based, telecommunications infrastructure network according to a first embodiment of the invention. A user equipment (UE) 101, such as a terminal, mobile/cellular phone, smart phone, pocket digital assistant (PDA), tablet computer, laptop, personal computer, or other device capable of wireless communication, e.g. non-user related equipment such as devices in machine-to-machine communication, communicates via a wireless communication link 120 with a radio access device, e.g. an eNodeB (eNodeB) 102, NodeB, Base station, or similar network infrastructure access device, which in turn communicate with a core network (104) handling charging, authentication, and connection to other communication devices and/or application services such as for instance Internet based services. The wireless communication link 120 may for example be based on a Long Term Evolution (LTE) or similar standard.

Figure 2:
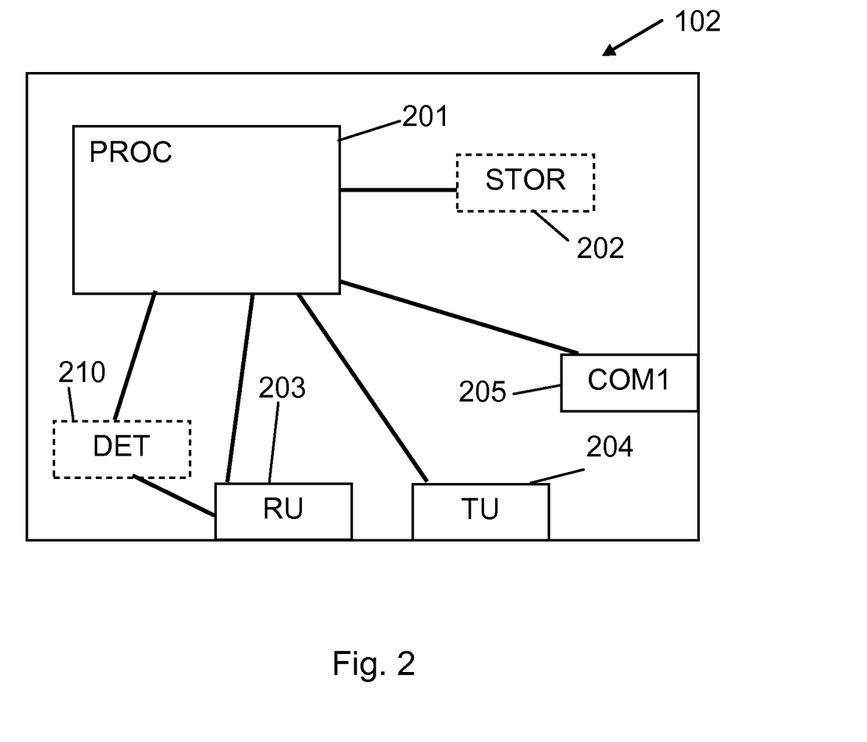
FIG. 2 is a schematic block diagram illustrating an exemplary device according to the present invention.

The eNodeB 102 comprise as is shown in FIG. 2, at least one processing unit 201 (PROC), optionally one or more computer readable memory units 202 (STOR) connected to the processing unit, at least one receiving unit 203 (RU), and at least one transmitting unit 204 (TU) each connected to the processing unit. Furthermore, the eNodeB also comprises a data communications interface (205) for communicating with the core network (104). Furthermore, the eNodeB may comprise an optional detection unit 210. The processing unit is arranged to receive and transmit control and/or data packets using the receiving and transmitting units. The processing unit is arranged to control data flow and operations according to the present invention within the e-NodeB between the memory, the receiving unit, the transmitting unit, the detection unit, and the communication interface and within the processing unit itself depending on functionality operated. The receiving unit and transmitting unit have been exemplified with two physical interfaces; however, it should be understood that it could be one physical interface or more than two physical interfaces depending on configuration. The communication interface may comprise an Ethernet interface or an asynchronous transfer mode (ATM) interface. The processing unit may comprise for instance a micro processor, an application specific integrated circuit (ASIC), a digital signal processor (DSP), or a field programmable gate array (FPGA). The memory unit may comprise any suitable volatile and/or non-volatile memory in a single unit or as a combination of units, the memory may comprise for instance a solid state memory, e.g. SSD, a random access memory (RAM) of any type, a hard disk (HD), and so on. In case the processing unit is arranged to operate instructions sets, such as the case of the processing unit being for instance a micro processor or DSP, the processing unit may then be arranged to operate instruction sets stored as software in the computer readable memory unit.

The main concept of the invention is to drastically reduce the hardware requirements put on eNodeB during PRACH detection. This may be done by sending random access response (RAR) messages un-solicited, so called speculative RAR messages, and/or by limiting the time resolution in the PRACH detector and utilize the fact that more than one UE transmitting in the same access slot is uncommon, thus simplifying the preamble detection. This may be done by utilizing the fact that the PRACH procedure may be used to measure and report the propagation delay between the UE and the eNodeB and that such a delay is very short for a small cell. The timing measurement of the PRACH for Long Term Evolution (LTE) results in a timing advance command (TA), transmitted to the UE from eNodeB, for example with timing resolution of 0.52 microseconds, which corresponds to a physical distance of about 150 meters. This rather coarse resolution is acceptable since Single Carrier-Frequency Division Multiple Access (SC-FDMA) symbols in LTE uplink in small LTE cells are preceded by for example a 4.7 microsecond long cyclic prefix, which ensures that the signalling between UE and eNodeB is aligned with enough accuracy if the cell is small enough.

FIG. 3 shows the PRACH signalling scheme between the UE and eNodeB. The signalling starts with the UE sending 301 a preamble within a predefined time window. The eNodeB send 302, periodically or triggered by detection of an incoming PRACH preamble from the UE, an un-solicited speculative Random Access Response (RAR) containing an identifier of a used preamble, if identified, within a given timeframe. The identifier shows optionally the detected preamble (out of the 64 possible) and a time-frequency slot in which the preamble was detected if detected. This RAR may also comprise timing alignment (TA) instructions, an initial uplink resource grant and an assignment of a Cell Radio Network Temporary Identifier (C-RNTI). The UE then responds 303 with a so-called "Step 3 message" which is used for early contention resolution, i.e. for instance to resolve any collisions related to several UEs using identical signatures when initiating the PRACH procedure. The eNodeB continues with sending 304 a message for early contention resolution.

The complete set of all 64 preambles is divided into a number of sub-sets, with one eNodeB detector per sub-set. The eNodeB detects if any (at least one) of the preambles in a sub-set is received and subsequently transmits a RAR message corresponding to all preambles in that sub-set. However, only UEs which actually transmitted a preamble will answer the RAR. These RAR (one per preamble in the sub-set) may be constructed such that they all specify the same initial uplink resource grant and C-RNTI, assuming that there was only one UE transmitting a preamble. The number of preambles in each sub-set may be any value between 2 and 64.

The PRACH may be configured so that N signatures are available in each access slot. The time distance T between access slots may also be configured. In one embodiment of the present invention no detector PRACH preamble detector is used and the eNodeB act as all N signatures are received each time T. As an assumptive response the eNodeB send N RAR messages pointing on the same C-RNTI each time T. So for each access slot, i.e. every time T:

1) Almost always there will not be any UE that sends a message due to that almost always no UE has transmitted a preamble, due to low load on PRACH. In this case there has been made time-frequency space for a step 3 message that never will be used.
2) In some cases there will be one UE that have sent a preamble. In such a case the UE will find corresponding RAR message and transmit its step 3 message.
3) In rare cases there will be more than one UE that have sent a preamble. In this case it will be of step 3 messages in the same manner as for an embodiment with simplified detector as will be discussed in more detail later in this document.

The access slots may be configured for example according to 3GPP 36.211: Table 5.7.1-2. Advantageously any "access slot scheme" according to the table is selected, and always send speculative RAR for each access slot in that scheme.

In order to reduce overhead communication transmissions, T may be configured to a large value; i.e. provide access slots more seldom. T may for instance be defined between 1 to 20 ms.

The small propagation delay of the small cell together with the coarse resolution for TA makes it possible to conclude that for cells that are small enough there is no need to estimate propagation delay. The size of the cell that the present invention may find applicability is determined by several factors, including number of UEs in the cell, the geographical conditions such as radius, objects possibly blocking and reducing the amount of UEs and/or the geographical size, and so on as long as the delay spread is kept low enough and that the risk of collisions due to responses from several UEs at the same time is also kept low enough. The only purpose of the PRACH detector is therefore to establish the UE identifier to be sent in the RAR message.

The RAR message is part of a MAC payload that actually may contain many RAR messages for many UE identities. The random access response may comprise a Random Access Radio Network Temporary Identifier (RA-RNTI) Medium Access Control (MAC) Payload (RAR1, RAR2, . . . , RARn) where RA-RNTI refer to the access slot where one or several preambles were detected; where RAR is message 302 in FIG. 3, and n is number of signatures that the simplified detector handle. Therefore it is possible to give several responses to PRACH preambles at the same time, and the PRACH procedure in the UE will continue if one of the RAR responses contains an identifier to the correct preamble for the specific UE. In case the eNodeB may, instead of exactly detecting sent preamble, detect that one out of the subset of preambles where sent, it is possible to within the same MAC payload send RAR messages that maps to the whole group of possible pre-amble sequences; hereby denoted as speculative RAR. The speculative random access response, RAR, message may comprise information relating to at least one of pre-amble identifier, allocated UE identifier, baseband, cyclic shift, and uplink resource allocation data, e.g. frequency.

In case more than one UE at the same time gets a RAR corresponding to its sent preamble, there will be a collision in the following step-3 message, which leads to a restarted PRACH procedure for all colliding UEs or all UEs except one. Since the number of users is small and they are also quite stationary this reduces the collision probability as compared to larger cell, e.g. a macro cell. If there would be a collision this is solved in the signalling after the RAR as shown in FIG. 3, i.e. step 304. Also, in normal PRACH procedure there is a risk for collision, and the risk increases with increasing number of UEs in the cell. The present invention gives increased collision probability compared to a full-blown PRACH procedure, but on the other hand, in a small cell there are less UEs, which will help keeping the risk for collision at acceptable levels.

There are some possible options for simplifying the PRACH handling in the eNodeB if speculative RAR is allowed:

1. Transmitting, optionally with some periodicity, an un-solicited speculative RAR message to UEs in the cell. If a UE has shortly before sent a PRACH preamble, the UE will respond to this speculative RAR message as if it was a normal RAR message in response to its sent PRACH preamble. The periodicity may be symmetrical, i.e. with the same time interval between each speculative RAR message or it may be un-symmetrical, i.e. for instance with a random time interval between each speculative RAR message.
2. Only detect that there is an incoming PRACH preamble and then send response comprising all possible preambles. All the responses grant the same uplink resource for step-3 message. For instance this may be done by sending a response comprising all possible preamble shifts for one sequence.
3. Only detect that there is an incoming PRACH preamble and then send response containing all possible preambles. However, the responses are divided in sub groups where each group grants a specific uplink resource for step-3 message. For instance this may be done by sending a response comprising all possible preamble shifts for one sequence.
4. Several "sub set detectors" are implemented in order to handle all possible preambles. For instance by detecting an incoming PRACH preamble and narrow down the number of possible shifts to a subset of the possible preambles. A response is sent containing all preambles, e.g. all preamble shifts in the subset.

The first option gives the most savings for the connection procedure, however potentially with an increased overhead, whereas the second option reduces the overhead but with some detection hardware for PRACH preamble reception. Assuming that the presence of a PRACH preamble can be efficiently detected it is also safe, since there is no risk of calculating wrong shift and sending an incorrect RAR.

The third option reduces the risk of step-3 message collision to the price of increased computation and increased overhead.

The fourth option reduces the risk of preamble collision as well as step-3 message collision to the price of increased computation. The degree of computation scales with the number of sub groups.

Below, a few examples are given of preamble detection embodiments in which the computational complexity is reduced. These algorithms detects if at least one, out of a set of preambles, is detected, without specific identification detection of individual preambles.

In a first embodiment as illustrated in FIG. 2 no detector is used since this embodiment is based on the periodic transmittal of speculative RAR messages to UEs in the cell.

Figure 4:
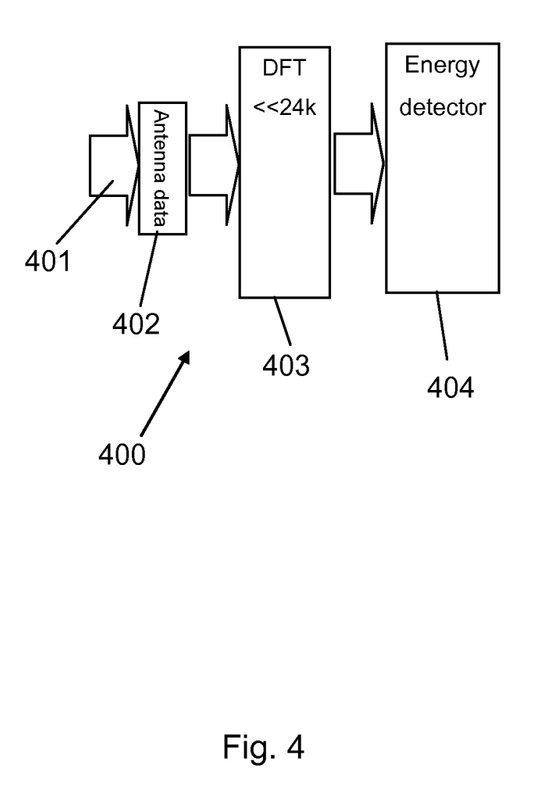
FIGS. 4, 5, and 6 each illustrate schematically exemplary PRACH detectors according to the present invention.

In a second embodiment as illustrated in FIG. 4, the receiving unit detector 400 may comprise a Discrete Fourier Transform (DFT) unit 403 receiving antenna data 402 from a wireless signal 401 and an energy detector 404. The receiving unit use several small Fast Fourier Transformers (FTTs) for bandpass filtering such that the PRACH frequency interval is extracted. Several FFTs is then used, where for each process a different time interval of received samples, such that energy from a large time interval is used. An energy detector 404 is used after extracted PRACH band to detect the presence of the preamble. With such an embodiment the detector may be designed with reduced complexity and may be fast and/or low cost both related to physical resources and to logical resources depending on functional operation. This simple detector may be used in accordance with the present invention since the general solution is based on the detection of the preamble and that there is no need for identifying each preamble but only the presence of one preamble.

Figure 5:
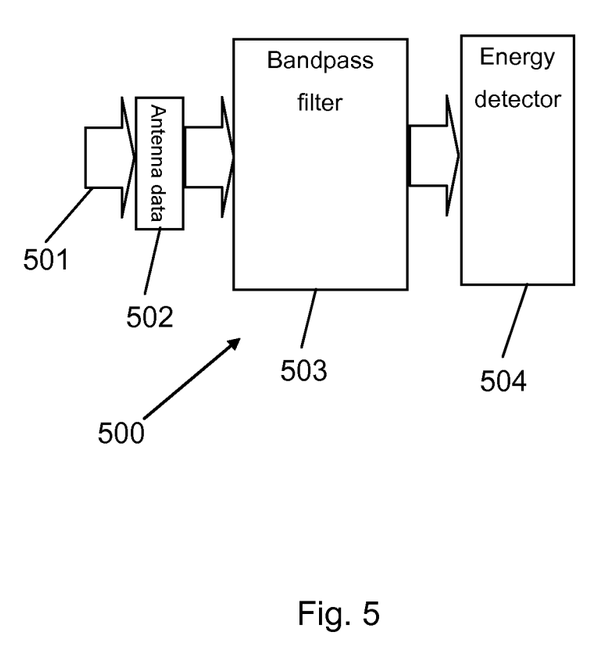

In a third embodiment as illustrated in FIG. 5, the receiving unit detector 500 may comprise a bandpass filter 503 receiving antenna data 502 from a wireless signal 501, and further comprise an energy detector 504. The receiving unit use the bandpass filter in the time domain such that the PRACH frequency interval is extracted. Again a simple energy detector 504 may be used and located after extracted PRACH band.

Figure 6:
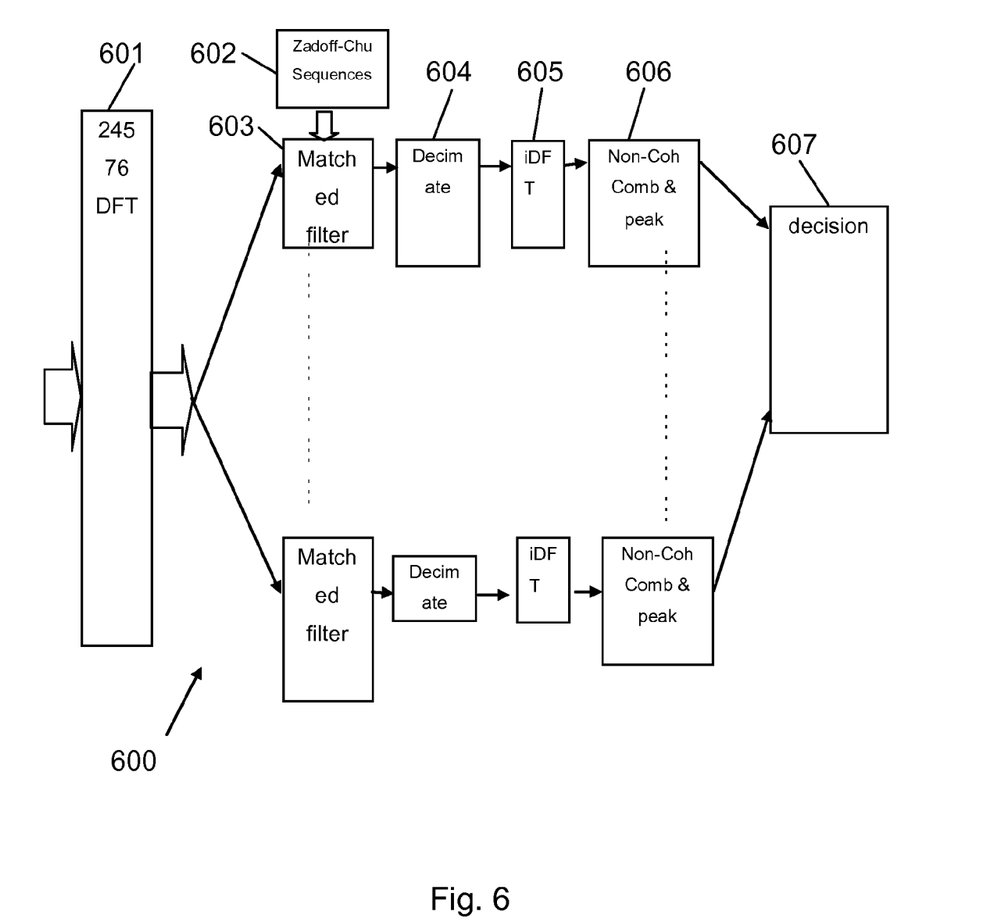

In a fourth embodiment as illustrated in FIG. 6, the receiving unit detector 600 may comprise a DFT unit 601 providing data to a number of matched filters 603 optionally controlled by Zadoff-Chu sequences 602. The output from each matched filter is decimated in a decimation unit 604 which in turn send output data to a corresponding inverse DFT 605 (iDFT). The iDFT unit sends output to Non-coherence combiner and peak detector (?) 606 which in turn feeds a decision unit 607. The receiving unit use a full FFT, for instance of size 24576, and a matched filter in frequency domain. But instead of 1024 sized Inverse FFTs (IFFTs), the frequency domain signal is decimated such that a small IFFT may be used. A decimation with factor K corresponds to extracting each K frequency domain sample and to throw away the rest of the samples. Each interval after this small IFFT will then contain energy from a sub-set of preambles which may be detected with a simple energy detector solution.

It should be noted that even though the term UE has been used for exemplifying a node accessing the infrastructure network through the eNodeB, other nodes within the concept of a UE, without demanding the presence of a user, may be accessing the network through a wireless channel, for instance terminals, machines connected in a machine-to-machine setup, sensors, electrical meters, vehicles, automatic teller machines (ATM), vending machines, and so on.

It should further be noted that with the term un-solicited RAR message is meant a message sent without knowledge of an identity of a connecting UE, either by not receiving a preamble at all or just receiving a preamble but not determining the UE identity from the PRACH preamble message. This RAR message may be called a speculative RAR message.

The present invention may find applicability in different types of cells for instance in picocells, femtocells, or similar, e.g. using a Home eNodeB. In these types of cells the number of UEs is often less than 100 or more often less than 50 and in a home based cell less than 10. The radius of the cells is often smaller than 1 km, or more often smaller than 500 m, 250 m, or even smaller than 150 m. Depending on the different parameters different combinations of number of UEs and cell radius is applicable for the present invention depending on delay, collision probability, noise, and other error sources.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

3GPP 3rd Generation Partnership Project
CP Cyclic Prefix
DL Downlink
FFT Fast Fourier Transform
IDFT Inverse Discrete Fourier Transform
IFFT Inverse Fast Fourier Transform
LTE Long Term Evolution
OFDM Orthogonal frequency-division multiplexing
OFDMA Orthogonal Frequency Division Multiple Access
PRACH Physical Random Access Channel
RACH Random Access Channel
RAR Random Access Response
SC-FDMA Single Carrier-Frequency Division Multiple Access
UE User Equipment
UL Uplink
UMTS Universal Mobile Telecommunications System

REFERENCES

3GPP TS 36.211, *"Physical Channels and Modulation"* Technical Specification, Group Radio Access Network, Release 10

The invention claimed is:

1. A network infrastructure access device in a wireless telecommunications network serving a wireless communication cell, wherein the device comprises:
   at least one processor;
   at least one receiving unit; and
   at least one transmitting unit, wherein the at least one processor is arranged to:
      send, using the transmitting unit, to at least one UE in the cell, a speculative random access response (RAR) message comprising a preamble identifier based on detection of a presence of the preamble from a signal on a physical random access channel (PRACH) signal received using the receiving unit from the at least one UE, wherein the preamble identifier is determined independent of an identity of a preamble transmitted by the at least one UE to the network infrastructure access device; and
      receive, using the receiving unit, an L2/L3 message from the at least one UE comprising an allocated UE identifier and an UE identity.

2. The device according to claim 1, where the at least one processor is further arranged to send the speculative RAR message with some periodicity.

3. The device according to claim 1, wherein the at least one processor is further arranged to handle a collision event in relation to receiving L2/L3 messages from several UEs.

4. The device according to claim 1, wherein the device is arranged to operate in a communication cell with a range radius of less than 500 m.

5. The device according to claim 1, wherein the device is arranged to handle less than 100 UEs at the same time in the cell.

6. The device according to claim 1, further comprising a PRACH detector arranged to detect a PRACH message on the communication interface.

7. The device according to claim 6, wherein the PRACH detector comprise a fast Fourier transform unit operating on a sub-set of available antenna signal data for extracting a received PRACH data set and further comprising an energy detector for detecting energy content in the received PRACH data set for detecting a presence of at least one PRACH message in a communication message received from at least one UE.

8. The device according to claim 1, wherein the device is arranged to only detect a PRACH signal irrespective of sending UE and transmit response message to at least one UE in the cell.

9. The device according to claim 1, wherein the allocated UE identifier is a Cell Radio Network Temporary Identifier (C-RNTI).

10. The device according to claim 1, wherein the RAR message is part of a Media Access Control (MAC) payload message.

11. The device according to claim 9, wherein the MAC payload comprise a plurality of RAR messages.

12. A method in a wireless telecommunications network serving a wireless communication cell, the method comprising steps of:
   sending, using the transmitting unit, to at least one UE in the cell, a speculative random access response (RAR) message comprising a preamble identifier based on detection of a presence of the preamble from a signal on a physical random access channel (PRACH) signal received using the receiving unit from the at least one UE, wherein the preamble identifier is determined independent of an identity of a preamble transmitted by the at least one UE to the network infrastructure access device; and
   receiving, using the receiving unit, an L2/L3 message from the at least one UE comprising an allocated UE identifier and an UE identity.

13. The method according to claim 12, wherein the step of detecting comprise using a sub-set of received antenna data for detecting energy content in PRACH.

14. The method according to claim 12, further comprising a step of handling collision events in relation to receiving L2/L3 messages from several UEs.

15. The method according to claim 12, wherein the step of sending the RAR message comprise sending the RAR message in a Media Access Control (MAC) payload message.

16. The method according to claim 12, wherein the allocated UE identifier is a Cell Radio Network Temporary Identifier (C-RNTI).

* * * * *